United States Patent [19]
Abe

[11] Patent Number: 5,740,022
[45] Date of Patent: Apr. 14, 1998

[54] POWER FACTOR IMPROVING CIRCUIT

[75] Inventor: Shigeo Abe, Kawagoe, Japan

[73] Assignee: Toko, Inc., Tokyo, Japan

[21] Appl. No.: 695,206

[22] Filed: Aug. 7, 1996

[30] Foreign Application Priority Data

Aug. 19, 1995 [JP] Japan ................................. 7-233480

[51] Int. Cl.$^6$ ................................................. H02J 1/02
[52] U.S. Cl. ........................ 363/39; 363/21; 363/37; 363/47; 323/207
[58] Field of Search ............................ 363/20, 21, 34, 363/37, 39, 40, 41, 44–47; 323/205, 207

[56] References Cited

U.S. PATENT DOCUMENTS 5,581,451 12/1996 Ochiai .............................. 363/21

FOREIGN PATENT DOCUMENTS

03117370 A 5/1991 Japan .
05219744 A 8/1993 Japan .

*Primary Examiner*—Peter S. Wong
*Assistant Examiner*—Shawn Riley
*Attorney, Agent, or Firm*—Dressler, Rockey, Milnamow & Katz, Ltd.

[57] ABSTRACT

A power factor improving circuit capable of obtaining a high power factor for a power supply circuit and at the same time of achieving a smaller size and lower cost of the power supply apparatus by a simple construction. To accomplish this object, a choke coil L1 is connected between the higher potential side output terminal of a rectifier 1 and the primary winding N1 of a transformer T of a converter circuit 2, and one end of a smoothing capacitor C1 is connected to a connecting point between the choke coil L1 and the primary winding N1 of the transformer T. The other end of the smoothing capacitor C1 is connected to the cathode of a first diode D1, to the anode of a second diode D2 and to the anode of a third diode D3. Connections are respectively made of the anode of the diode D1 to the lower potential side output terminal of the rectifier 1, the cathode of the diode D2 to a connecting point between the primary winding N1 and a switching transistor Q1, and the cathode of the diode D3 to a connecting point toward the rectifier 1 of the choke coil L1.

4 Claims, 1 Drawing Sheet

POWER FACTOR IMPROVING CIRCUIT

BACKGROUND OF THE INVENTION

1. Field of the Invention

The present invention relates to a power factor improving circuit having a simple construction which may be incorporated into the power supply circuit of an electronic equipment.

2. Description of the Prior Art

In a power supply circuit receiving a supply of power from a commercial ac power source, an input current having a small flow angle and high peak value is generated near the peak value of the alternating voltage by charging a smoothing capacitor through a rectifier provided on the input side of the power supply circuit. Higher harmonics are generated on the commercial ac power line by the current having a small flow angle and high peak value. Various measures for suppressing such higher harmonics have been proposed since the revealing of the problem that the higher harmonics adversely affect other electronic equipments. An object in these higher harmonics suppressing measures is to bring the power factor of input of the power supply circuit lowered due to a distortion of current waveform to a level close to 1.0. For this reason, such higher harmonic suppressing measures are referred to also as power-factor improvement.

One of the representative means for the power factor improvement is referred to as two-converter system.

In this system, a first converter constructed in such a manner as to increase or decrease the value of an input current following the waveform of an input voltage is provided on the output side of a rectifier connected to the commercial ac power source. Further, a second converter for stabilizing the output of the first converter and supplying power to a load is provided on the output side of the first converter.

Here, a step-up chopper circuit is mainly used as the first converter, and a pulse-width-modulated DC-DC converter or an inverter circuit for high-frequency conversion is suitably used as the second converter.

The step-up chopper circuit to be used as the first converter is characterized in that a choke coil repeats storing and releasing of energy by an operation of a switching device of the step-up chopper circuit, thereby charging a smoothing capacitor on the output side of the step-up chopper at a voltage value higher than the voltage input to the step-up chopper circuit. At this time, if a pulsating rectifier output is supplied to the step-up chopper circuit from the rectifier, the current flowing into the step-up chopper is increased or decreased in proportion to the applied voltage so that the input current exhibits a current waveform approximating the voltage waveform of the input voltage.

In other words, the two-converter system attempts to eliminate a waveform distortion of the current flowing into the power supply circuit by using the above described characteristics so as to improve the power factor thereof.

Other than the two-converter method, there is a method of limiting the charging current of a smoothing capacitor on the output side of the rectifier. In particular, a dither circuit or an inrush current suppressing circuit is connected in series with the smoothing capacitor. These are both an attempt to increase the charging time period of the smoothing capacitor and to achieve a greater flow angle of the current flowing into the power supply circuit by controlling the flow amount of charging current of the smoothing capacitor so as to improve the power factor.

With respect to the two-converter system, since the waveforms of input current and input voltage approximate each other, the power factor is improved to about 1.0. This is one of the means providing a highest power factor improving effect among the currently proposed power-factor improvement means. With this method, however, since it is necessary to provide an additional converter for the power-factor improvement, the number of component parts of the circuit is increased to result in an increased size and/or higher cost of the power supply apparatus.

On the other hand, with the method of providing a dither circuit or an inrush current suppressing circuit, since a control circuit or the like necessary for its operation is also provided, an increase in size and/or cost of the apparatus results, though not to the extent of the two converter system. Further, in this method, since there is a case where an input voltage is directly applied to the smoothing capacitor, it has been necessary to use a high-voltage smoothing capacitor corresponding to the peak value thereof. Furthermore, since an input voltage is directly applied to the smoothing capacitor, there has been a disadvantage that it is difficult to use the power supply circuit for ac voltage sources of different voltage for example for both a 100-V system and a 200-V system.

SUMMARY OF THE INVENTION

In view of the above problems, it is an object of the present invention to provide a power factor improving circuit capable of achieving a reduction in size and cost by using a simple construction and at the same time obtaining a high power factor for a power supply circuit.

In accordance with the present invention, there is provided a power factor improving circuit disposed in a power supply circuit applying an output voltage of a rectifier connected to a commercial ac power source on a series circuit consisting of a primary winding and a switching device to induce a voltage on a secondary winding of a transformer by causing an ON/OFF operation of the switching device so as to obtain a desired output voltage, the power factor improving circuit including a choke coil connected between one of the output terminals of the rectifier and one end of the primary winding of the transformer; a smoothing capacitor connected at one end thereof to a connecting point between the choke coil and the primary winding of the transformer; a first unidirectional conduction means connected between the other end of the smoothing capacitor and the other output terminal of the rectifier and having a forward direction thereof along which the discharge current of the smoothing capacitor flows toward said series circuit consisting of the primary winding of the transformer and the switching device; a second unidirectional conduction means connected between a connecting point of the primary winding of the transformer and the switching device and the other end of the smoothing capacitor and having a forward direction thereof along which a charging current flows toward the smoothing capacitor when the switching device is in the on state; and a third unidirectional conduction means connected between a connecting point of the choke coil and the rectifier and the other end of the smoothing capacitor and having a forward direction thereof along which the smoothing capacitor is charged up by an energy released from the choke coil.

A circuit having the construction substantially the same as a choke-input type smoothing circuit using a choke coil and a smoothing capacitor is provided between a rectifier connected to an external commercial ac power source and an inverter (or converter) circuit for supplying power to a load.

Here, the choke coil of the smoothing circuit is connected between one output terminal of the rectifier and the primary winding of the transformer of the converter circuit, and one end of the smoothing capacitor is connected to a connecting point between the choke coil and the primary winding.

The other end of the smoothing capacitor is connected to a connecting point of the rectifier and the switching device of the converter circuit through a first diode, to a connecting point between the primary winding of the transformer and the switching device of the converter circuit through a second diode, and to one end of the rectifier side of the choke coil through a third diode, respectively.

Of the above described first diode, the forward direction forms a current path for the discharge of the smoothing capacitor. The forward direction of the second diode forms a current path for charging the smoothing capacitor by an output of the rectifier in accordance with the operation of the switching device of the converter circuit. The forward direction of the third diode forms a current path for charging the smoothing capacitor by a released energy of the choke coil.

DESCRIPTION OF THE PREFERRED EMBODIMENTS

Figure 1:
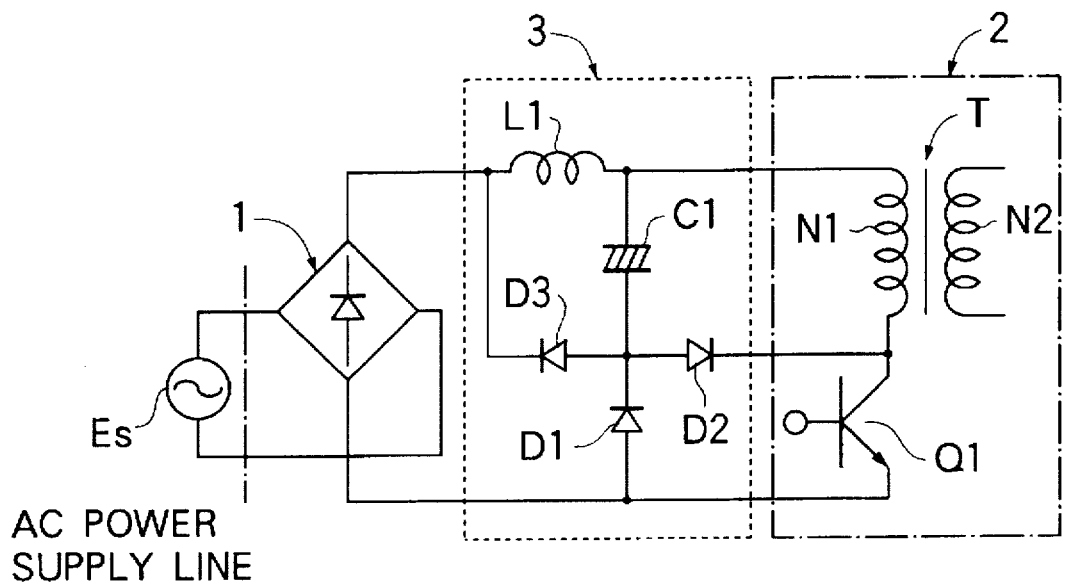
FIG. 1 is a circuit diagram showing a first example of the power supply circuit incorporating a power factor improving circuit according to the present invention.

An example is shown in FIG. 1 of a power supply circuit in which a power factor improving circuit having a simple construction according to the present invention is provided. The circuit construction thereof is as follows. Referring to FIG. 1, what is denoted by numeral 1 is a rectifier connected at an input terminal thereof to a commercial ac power source, and numeral 2 denotes a converter circuit. Only a main portion of the converter circuit 2 toward the input side from a transformer T is shown for convenience of explanation, and a rectification smoothing circuit or the like provided toward the output side from a secondary winding N2, a control circuit provided on the base side of a switching transistor Q1 and so forth are not shown.

A higher potential side output terminal of the rectifier 1 is connected to one end of a primary winding N1 of the transformer T through a choke coil L1, the other end of the primary winding N1 is connected to a collector of a switching transistor Q1 of an NPN type transistor, and an emitter of the switching transistor Q1 is connected to a lower potential side output terminal of the rectifier 1.

One end of a smoothing capacitor C1 is connected to a connecting point between the choke coil L1 and the primary winding N1 of the transformer T. The other end of the smoothing capacitor C1 is connected to a cathode of a diode D1 serving as a first unidirectional conduction means, to an anode of a diode D2 serving as a second unidirectional conduction means, and to an anode of a diode D3 serving as a third unidirectional conduction means. The anode of the diode D1 is connected to a lower potential side output terminal of the rectifier 1, the cathode of the diode D2 is connected to a collector of the switching transistor Q1, and the cathode of the diode D3 is connected to one end toward the rectifier 1 of the choke coil L1.

A power factor improving circuit 3 is constituted by the choke coil L1, smoothing capacitor C1, and diodes D1, D2, D3.

The operation of the power factor improving circuit having such circuit construction is as follows.

First, in the case where the output voltage of the rectifier 1 is relatively higher than the voltage across the terminals of the smoothing capacitor C1, when the switching transistor Q1 has been brought into the on state, a current flows through two paths, i.e., the path from the rectifier 1 through the choke coil L1, primary winding N and switching transistor Q1 and the path from the rectifier 1 through the choke coil L1, smoothing capacitor C1, diode D2 and switching transistor Q1. Power transmission is thereby effected from the primary winding N1 to the secondary winding N2 of the transformer T, and at the same time the storing of energy to the choke coil L1 and the charging of the smoothing capacitor C1 take place.

Then, when the switching transistor Q1 has been brought into the off state, the choke coil L1 releases the stored energy through the path of the smoothing capacitor C1 and diode D3 so as to charge up the smoothing capacitor C1.

Next, in the case where the output voltage of the rectifier 1 is relatively lower than the voltage across the terminals of the smoothing capacitor C1, when the switching transistor has been brought into the on state, a current flows from the smoothing capacitor C1 through the path of primary winding N1, switching transistor Q1 and diode D1. Power transmission is thereby effected from the primary winding N1 to the secondary winding N2 of the transformer T.

As can be seen from the above operation, at the time of charging of the smoothing capacitor C1, the peak value of the charging current is suppressed to a low level by the choke coil L1 which exists in the current path of the charging current. Further, the charging of the smoothing capacitor C1 is intermittent due to the ON/OFF operation of the switching transistor Q1. Here, the choke coil L1 and switching transistor Q1 equivalently serve a function similar to the switching device and inductance element of a step-down chopper circuit with respect to the smoothing capacitor C1 so that the voltage across the terminals of the smoothing capacitor C1 is continuously kept lower than the peak value of the output voltage of the rectifier 1.

As a result, the charging time period of the smoothing capacitor C1 becomes longer in the circuit shown in FIG. 1 and the flow angle of the current flowing into the power supply circuit is increased to thereby improve the power factor of the power supply circuit. In addition, since the voltage across the terminals of the smoothing capacitor C1 can be kept to a low level, one withstanding only a low voltage can be used as the smoothing capacitor.

Further, by the action of the choke coil L1 and switching transistor Q1, the peak value of the current flowing into the power supply circuit can be kept lower not only at a steady state of operation but also at the time of starting so that it also functions as a circuit for preventing an inrush current.

Figure 2:
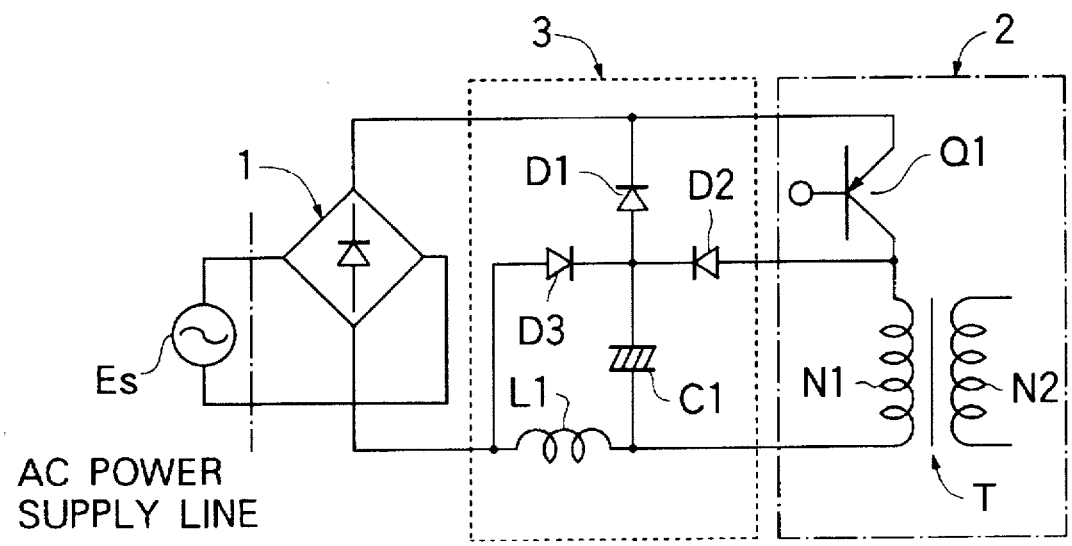
FIG. 2 is a circuit diagram showing a second example of the power supply circuit incorporating a power factor improving circuit according to the present invention.

A circuit construction is shown in FIG. 2 of the case of applying a power factor improving circuit of the present invention to a power supply circuit where a PNP transistor is used as switching transistor Q1 and the connected positions of the switching transistor Q1 and transformer T with respect to the output terminals of the rectifier 1 are reversed.

It should be noted that those circuit components in FIG. 2 having the same function as those in FIG. 1 are denoted by the same reference numerals.

Referring to FIG. 2, choke coil L1 is provided so as to be connected in series with primary winding N1 of transformer T in a similar manner as in FIG. 1. The diodes D1, D2, D3 are respectively reversed in connection at their anode and cathode with respect to the smoothing capacitor C1.

The operation of the circuit as shown in FIG. 2 is identical as the circuit in FIG. 1 and a description thereof will be omitted.

While the power factor improving circuits of the present invention shown in FIG. 1 and 2 have been described as using the diodes D1, D2 and D3 as the first, second and third unidirectional conduction means, respectively, it is also possible to use semiconductor devices such as a transistor or thyristor which are adapted to perform an operation corresponding to the diode devices.

Further, transistor devices performing as ON/OFF operation in synchronization with the switching transistor Q1 for example may be used for the diodes D1, D2 in FIGS. 1 and 2.

The rectifier 1 and the converter 2 are not limited to those illustrated in the above embodiments and various modifications thereof are naturally possible within the scope of the construction and operation of the power factor improving circuit of the present invention.

As has been described above, in the power factor improving circuit of the present invention, a circuit having substantially the same construction as a choke-input type smoothing circuit based on a choke coil and smoothing capacitor is provided on the output side of a rectifier. Connected to the smoothing capacitor of the smoothing circuit are the first unidirectional conduction means forming a discharging path of the smoothing capacitor; the second unidirectional conduction means forming a charging path for charging the smoothing capacitor by an output of the rectifier in accordance with the operation of the switching device of the converter circuit; and the third unidirectional conduction means forming a charging path for charging the smoothing capacitor by an energy released from the choke coil.

The peak value of the charging current flowing into the smoothing capacitor is thereby kept to a low level and the flow angle of the charging current is increased so that it become possible to obtain a high power factor. Then, the voltage across the terminals of the smoothing capacitor can be continuously kept lower than the peak value of the output voltage of the rectifier so that one withstanding only a low voltage can be used as the smoothing capacitor. Further, the peak value of the current flowing into the power supply circuit can be efficiently kept to a low level not only at a steady state of operation but also at the time of starting so that it also functions as a circuit for preventing an inrush current. Furthermore, since the construction of a power factor improving circuit according to the present invention is simple and a control circuit for the power factor improving circuit is not necessary, a reduced size and lower cost can be achieved of a power supply circuit at the same time of improving the power factor thereof.

I claim:

1. A power factor improving circuit disposed in a power supply circuit applying an output voltage of a rectifier connected to a commercial ac power supply to a series circuit consisting of a primary winding of a transformer and a switching device and causing an ON/OFF operation of the switching device to induce a voltage on a secondary winding of the transformer so as to obtain a desired output voltage, the power factor improving circuit comprising:

a choke coil connected between one of the output terminals of the rectifier and one end of the primary winding of the transformer;

a smoothing capacitor connected at one end thereof to a connecting point between the choke coil and the primary winding of the transformer;

a first unidirectional conduction means connected between the other end of the smoothing capacitor and the other output terminal of the rectifier and having a forward direction thereof along which a discharge current of the smoothing capacitor flows toward said series circuit consisting of the primary winding of the transformer and the switching device;

a second unidirectional conduction means connected between a connecting point of the primary winding of the transformer and the switching device and the other end of the smoothing capacitor and having a forward direction thereof along which a charging current flows toward the smoothing capacitor when the switching device is in its on state; and a third unidirectional conduction means connected between a connecting point of the choke coil and the rectifier and the other end of the smoothing capacitor and having a forward direction thereof along which the smoothing capacitor is charged up by an energy release of the choke coil.

2. A power factor improving circuit according to claim 1 wherein said first, second and third unidirectional conduction means are formed from diodes.

3. A power factor improving circuit disposed in a power supply circuit applying an output voltage of a rectifier connected to a commercial ac power supply to a series circuit consisting of a primary winding of a transformer and a switching device and causing an ON/OFF operation of the switching device to induce a voltage on a secondary winding of the transformer so as to obtain a desired output voltage, the power factor improving circuit comprising;

a choke coil connected between a higher potential side output terminal of the rectifier and one end of the primary winding of the transformer;

a smoothing capacitor connected at one end thereof to a connecting point between the choke coil and the primary winding of the transformer;

a first diode connected at a cathode thereof to the other end of the smoothing capacitor and at an anode thereof to a lower potential side output terminal of the rectifier;

a second diode connected at an anode thereof to the cathode of the first diode and at a cathode thereof to a connecting point between the primary winding of the transformer and the switching device; and a third diode connected at an anode thereof to the cathode of the first diode and at a cathode thereof to the higher potential side output terminal of the rectifier.

4. A power factor improving circuit disposed in a power supply circuit applying an output voltage of a rectifier connected to a commercial ac power supply to a series circuit consisting of a primary winding of a transformer and a switching device and causing an ON/OFF operation of the switching device to induce a voltage on a secondary winding of the transformer so as to obtain a desired output voltage, the power factor improving circuit comprising:

a choke coil connected between a lower potential side output terminal of the rectifier and one end of the primary winding of the transformer;

a smoothing capacitor connected at one end thereof to a connecting point between the choke coil and the primary winding of the transformer;

a first diode connected at an anode thereof to the other end of the smoothing capacitor and at a cathode thereof to a higher potential side output terminal of the rectifier;

a second diode connected at a cathode thereof to the anode of the first diode and at an anode thereof to a connecting point between the primary winding of the transformer and the switching device; and a third diode connected at a cathode thereof to the anode of the first diode and at an anode thereof to the lower potential side output terminal of the rectifier.

* * * * *